United States Patent
Chou et al.

(10) Patent No.: US 12,539,549 B2
(45) Date of Patent: Feb. 3, 2026

(54) SAWING MACHINE HAVING CONTROL HANDLE FEATURING THREE-STAGE ADJUSTMENT FUNCTION

(71) Applicant: REXON INDUSTRIAL CORPORATION LTD., Taichung (TW)

(72) Inventors: Thing-Tai Chou, Taichung (TW); Cheng-Hsun Tsai, Taichung (TW)

(73) Assignee: REXON INDUSTRIAL CORPORATION LTD., Taichung (TW)

( * ) Notice: Subject to any disclaimer, the term of this patent is extended or adjusted under 35 U.S.C. 154(b) by 101 days.

(21) Appl. No.: 18/648,783

(22) Filed: Apr. 29, 2024

(65) Prior Publication Data

US 2024/0367244 A1 Nov. 7, 2024

(30) Foreign Application Priority Data

May 5, 2023 (TW) .................................. 112116891

(51) Int. Cl.
*B23D 45/04* (2006.01)
*B27B 5/29* (2006.01)

(52) U.S. Cl.
CPC .............. *B23D 45/044* (2013.01); *B27B 5/29* (2013.01); *Y10T 83/7697* (2015.04); *Y10T 83/8773* (2015.04)

(58) Field of Classification Search
CPC .............. Y10T 83/7697; Y10T 83/7788; Y10T 83/8773; B23D 45/048; B23D 47/025; B27B 5/29; B27B 5/36
See application file for complete search history.

(56) References Cited

U.S. PATENT DOCUMENTS

| 5,383,382 A * | 1/1995 | Garuglieri | B23D 45/044 83/581 |
| 5,988,031 A * | 11/1999 | Wixey | B23D 45/048 83/486.1 |
| 6,532,853 B1 * | 3/2003 | Kakimoto | B23D 45/044 83/699.51 |

(Continued)

FOREIGN PATENT DOCUMENTS

| CN | 201061835 Y * | 5/2008 | E05B 53/005 |
| DE | 4404019 A1 * | 8/1995 | B23D 45/048 |

(Continued)

*Primary Examiner* — Laura M Lee
(74) *Attorney, Agent, or Firm* — MUNCY, GEISSLER, OLDS & LOWE, P.C.

(57) ABSTRACT

A sawing machine includes a base, a pivot mount connected with the base, a support post rotatably connected with the pivot mount, a rocker arm pivotally connected with the support post, a saw blade rotatably mounted to the rocker arm, and a bevel angle control mechanism including a control handle pivotally disposed with a front side of the base and rotatable at different angles, a pull rod unit, a positioning pin unit, a positioning turntable, and a retaining block. With the collaboration among the control handle, the pull rod unit, the positioning pin unit, the positioning turntable, and the retaining block, a three-stage adjustment functions of locking, unlocking, and disengaging at specific angles can be achieved.

8 Claims, 14 Drawing Sheets

(56) References Cited

U.S. PATENT DOCUMENTS

| | | | | |
|---|---|---|---|---|
| 6,658,977 | B2 * | 12/2003 | Chang | B23D 45/044 83/490 |
| 6,662,697 | B1 * | 12/2003 | Chen | B27B 5/29 83/490 |
| 6,860,183 | B1 * | 3/2005 | Chen | B27B 5/29 83/490 |
| 7,127,977 | B2 * | 10/2006 | Carroll | B27B 5/29 83/477.1 |
| 7,201,090 | B2 * | 4/2007 | Svetlik | B27B 5/29 83/477.1 |
| 7,311,028 | B2 * | 12/2007 | Garcia | B23D 59/002 83/477.1 |
| 7,430,949 | B2 * | 10/2008 | Chiu | B27B 5/29 83/490 |
| 7,798,041 | B2 * | 9/2010 | Hetcher | B23D 45/044 83/490 |
| 8,960,063 | B2 * | 2/2015 | Kaye, Jr. | B27B 5/29 83/581 |
| 9,403,225 | B2 * | 8/2016 | Xu | B27B 5/29 |
| 9,662,724 | B1 * | 5/2017 | Knight | B23D 47/02 |
| 10,434,588 | B1 * | 10/2019 | Chang | B27B 5/29 |
| 10,486,249 | B2 * | 11/2019 | Gonzalez | B27B 27/06 |
| 10,898,960 | B2 * | 1/2021 | Ceroll | B27B 5/29 |
| 11,383,311 | B2 * | 7/2022 | Suzuki | B23D 47/025 |
| 11,897,044 | B2 * | 2/2024 | Suzuki | B23D 45/044 |
| 12,186,817 | B2 * | 1/2025 | Kani | B23D 45/044 |
| 2008/0210073 | A1 * | 9/2008 | Zhang | B27B 5/29 83/471.3 |
| 2011/0314988 | A1 * | 12/2011 | Xu | B27B 5/29 83/471.3 |

FOREIGN PATENT DOCUMENTS

| | | | | |
|---|---|---|---|---|
| DE | 102006059752 A1 * | 6/2008 | | B23D 45/048 |
| EP | 1410886 A2 * | 4/2004 | | B27B 5/29 |
| EP | 1935543 A1 * | 6/2008 | | B23D 59/002 |
| JP | 2022090789 A * | 6/2022 | | |
| TW | I637800 B | 10/2018 | | |

\* cited by examiner

SAWING MACHINE HAVING CONTROL HANDLE FEATURING THREE-STAGE ADJUSTMENT FUNCTION

BACKGROUND OF THE INVENTION

1. Field of the Invention

The present invention relates to a sawing machine and more particular, to a sawing machine having a control handle featuring three-stage adjustment function, wherein the control handle is located at a front side of the sawing machine.

2. Description of the Related Art

Conventional sawing machines, such as the sawing machine disclosed in Taiwan Patent No. 1637800, are mainly composed of a worktable and a sawing unit. The worktable has a pivot mount and a positioning component for locking the sawing unit in place. As shown in FIG. 1 of the aforesaid patent, the positioning component is located at a rear side of the worktable, and as described in paragraph 0017 of its specification, the sawing unit can rotate to a predetermined angle relative to the saw table about an axis L serving as the center of rotation, thereby allowing the saw blade of the sawing unit to form a predetermined working angle. Since the positioning component of the aforesaid patent is located at the rear side of the worktable and an operator typically operates the sawing machine from the front side of the worktable, the operator needs to move to the rear side of the worktable to loosen or tighten the positioning component, and then return to the working position at the front side of the worktable to operate the sawing machine if the operator would like to adjust the saw blade to a desired working angle. It can be seen that the structural design of existing sawing machines is inconvenient in operation and there is room for improvement.

SUMMARY OF THE INVENTION

The present invention has been accomplished in view of the above-noted circumstances. It is an objective of the present invention to provide a sawing machine, which allows the operator to conveniently adjust the tilt angle when cutting a workpiece.

Another objective of the present application is to provide a sawing machine having a control handle featuring three-stage adjustment function, which can control the sawing machine at different operating states based on various rotational angles of the control handle.

To attain the above objectives, the present application provides the following technical solution.

A sawing machine having a control handle featuring a three-stage adjustment function comprises a base assembly, a sawing assembly, and a bevel angle control mechanism. The base assembly includes a base and a pivot mount connected with a rear side of the base. The sawing assembly comprises a support post, a rocker arm, a saw blade, and a driving device. The support post is rotatably connected with the pivot mount and rotatable about a rotation axis. The rocker arm is pivotally connected with the support post and swingable towards the base assembly. The saw blade is rotatably mounted to the rocker arm, and the driving device is disposed with the rocker arm to drive the saw blade to rotate.

The above-mentioned bevel angle control mechanism comprises a control handle, a pull rod unit, a positioning pin unit, a positioning turntable, and a retaining block. The control handle is pivotally disposed with a front side of the base and rotatable among a locked position, an unlocked position, and a disengaged position. The pull rod unit is disposed with the base and provided with a pull rod connected with the control handle in a way that the pull rod is driven by the control handle to move along an axial direction of the pull rod. The positioning pin unit is disposed with the base, connected with the pull rod, and provided with a positioning pin in a way that the positioning pin moves along with the pull rod in a direction parallel to the axial direction of the pull rod and opposite to a moving direction of the pull rod. The positioning turntable is mounted to the support post and rotatable with the support post. The positioning turntable includes an arc groove, through which the pull rod passes, and at least one positioning hole. The retaining block is mounted on an end of the pull rod remote from the control handle.

Wherein when the control handle is in the locked position, the retaining block firmly presses against the positioning turntable, and an end of the positioning pin is stopped against a front side of the positioning turntable or inserted into the at least one positioning hole. When the control handle is in the unlocked position, the retaining block is disengaged from the positioning turntable, i.e., does not firmly abutted against the positioning turntable, and the end of the positioning pin is stopped against the front side of the positioning turntable or inserted into the at least one positioning hole. When the control handle is in the disengaged position, the retaining block is disengaged from the positioning turntable, and the end of the positioning pin is disengaged from the at least one positioning hole.

With the structural design of the sawing machine described above, since the control handle is located on the front side of the base, it is convenient for the operator to rotate the control handle to allow the support post along with the rocker arm and other components mounted on the support post to be rotated to different angles. Furthermore, the control handle is used to lock the positioning turntable together with the support post connected with the positioning turntable, allowing the operator to saw the workpiece at different angles.

In one aspect, as the control handle is rotated between different positions, when the control handle is rotated to the locked position, the control handle can drive the pull rod to fix the support post by the retaining block; or when the control handle is rotated to the unlocked position, the control handle drives the pull rod to allow the retaining block to move away from the positioning turntable, allowing the support post to rotate freely. Even when the support post is rotated to a common angle (corresponding to the angle set by the positioning hole), by rotating the control handle to the disengaged position, the support post can be returned to a state where it can rotate freely. That is, through a single control handle, the operator can reach three different functions (locking, unlocking, and disengaging the positioning angle) without leaving the front side of the sawing machine, thereby greatly improving the convenience of operation and saving operation time.

In another aspect, the above-mentioned sawing machine may be, but is not limited to, a mitre saw.

In still another aspect, the positioning pin unit may further comprise a rotating bracket in-site rotatably mounted on the base. The rotating bracket comprises a first arm connected with the pull rod, and a second arm parallel to the first arm and connected with the positioning pin. By the rotating bracket, when the pull rod moves forward, the positioning pin can move backward, or when the pull rod moves backward, the positioning pin can move forward. In some cases, other mechanical structures, such as linkage mechanism, may also be used to drive the pull rod and the positioning pin to move in reverse directions. Therefore, the present invention should not be limited to the following embodiments.

In still another aspect, the positioning pin unit may further comprise a spring housing barrel disposed with the base and provided with a bottom having a through hole, and a compression spring. The positioning pin is movably mounted in the spring housing barrel and passes through the through hole. The positioning pin has a head portion, and at least a portion of the head portion protrudes outside the spring housing barrel. The compression spring is abutted between the bottom of the spring housing barrel and the head portion.

In still another aspect, the head portion may have a conical surface, thereby allowing the positioning pin to smoothly disengage from the positioning hole.

In still another aspect, the pull rod unit may comprise a set of connecting rods, such that the control handle is connected with the pull rod via the set of connecting rods. The set of connecting rods may comprise a first rod and a second rod. The first rod has an end connected with the control handle, and an opposite end pivotally connected with the second rod. The second rod has an end, which is remote from the first rod and pivotally connected with the pull rod, thereby converting the rotation of the control handle into a back-and-forth movement of the pull rod. In some cases, other mechanical structures may also be used to convert the rotation of the control handle into the back-and-forth movement of the pull rod, so the present invention should not be limited to the following embodiments.

In still another aspect, the set of connecting rods may comprise a connecting shaft. The control handle is connected with the first rod via the connecting shaft. The second rod has a notch. When the control handle is in the locked position, the connecting shaft is engaged in the notch. Therefore, when the operator rotates the control handle to the locked position, the control handle can produce a clear sense of fastening firmness.

In still another aspect, when the control handle is in the disengaged position, the pull rod is located at a first position, and when the control handle is in the unlocked position, the pull rod is located at a second position. The first position is closer to the support post than the second position is.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
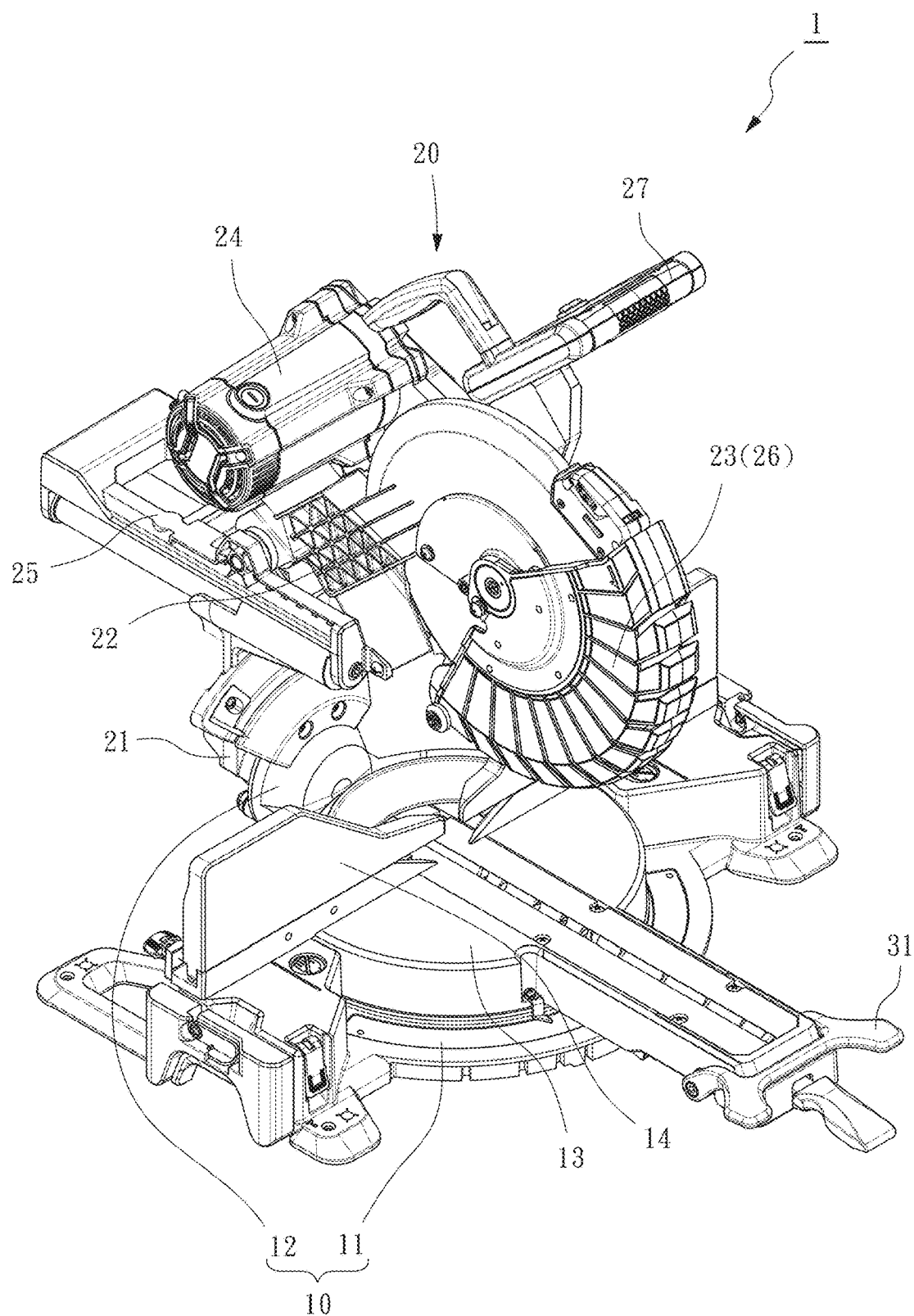
FIG. 1 is a perspective view of a sawing machine according to an embodiment of the present invention.

The technical content and features of the present invention will be described in detail in conjunction with the drawings through one or more embodiments described below. The directional descriptive terms such as "up, down, inner, outer, top, and bottom" mentioned in the specification are merely exemplary descriptive terms based on normal usage directions and are not intended to limit the scope of the claims.

Furthermore, singular quantity terms such as "one, a, and the" used in the claims of the present invention encompass the meanings of multiple. Therefore, for example, the description of "a member" refers to one or more members, including equivalent substitutions known to those skilled in the art. All conjunctions used in similar situations should also be understood in the broadest sense, and specific shapes, structural features, or technical terms described in the specification should also be understood to include equivalent substitute structures or technical terms that can achieve the same functions.

In order to detailedly illustrate the technical features of the present invention, the following embodiments are provided and described with reference numerals denoted in the drawings.

Figure 2:
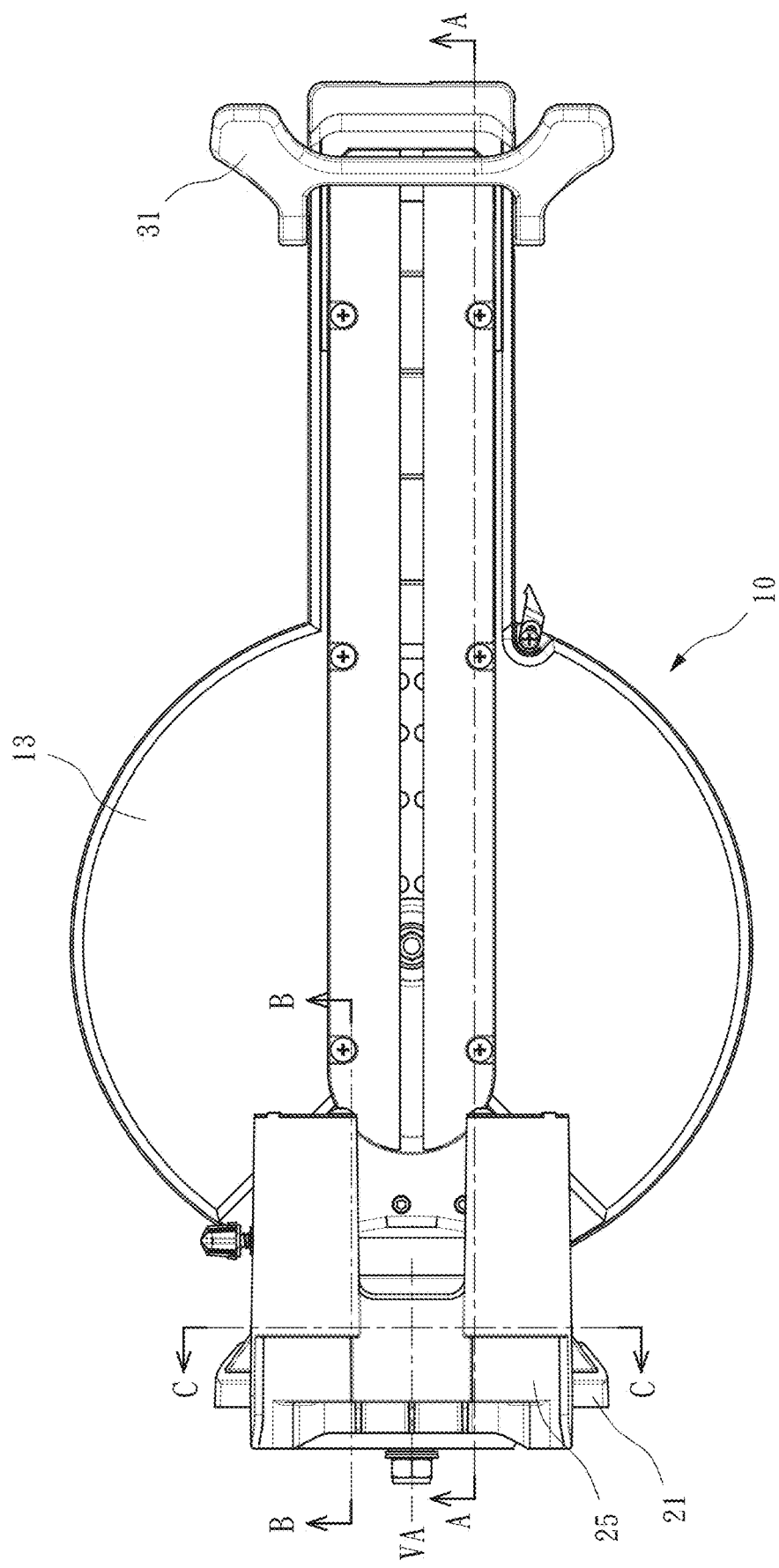
FIG. 2 is a top view of FIG. 1, in which the sawing assembly in omitted.
Figure 3:
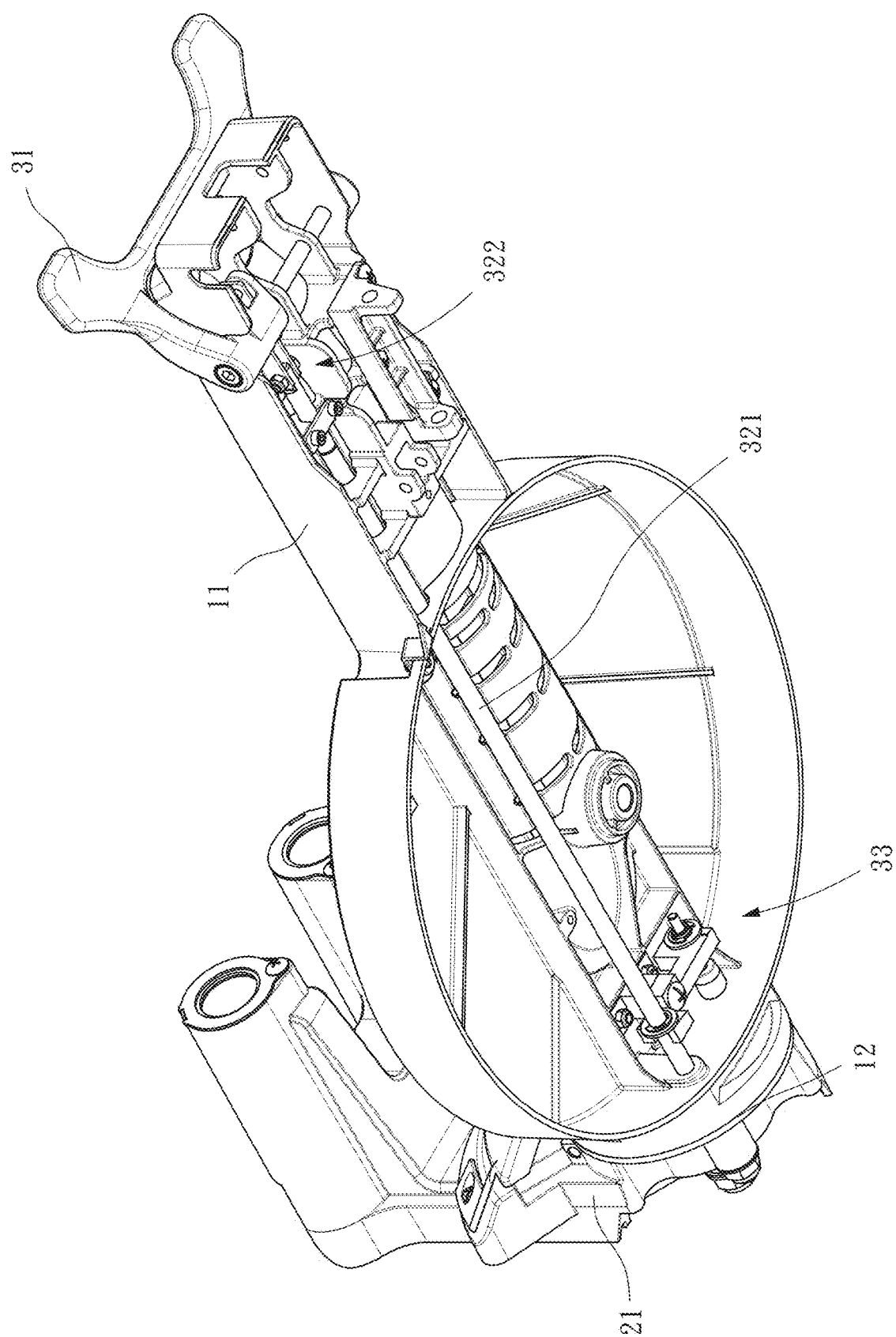
FIG. 3 is another perspective view of the sawing machine according to the embodiment of the present invention view from another angle, in which the sawing assembly is omitted.

As shown in FIGS. 1 to 3, a sawing machine 1 provided by an embodiment of the present invention comprises a base assembly 10, a sawing assembly 20, and a bevel angle control mechanism 30. For ease of explanation in this embodiment, the side of the base assembly 10, at which the control handle 31 of the bevel angle control mechanism 30 is mounted, will be referred to as a front side of the sawing machine 1 in the whole specification.

The base assembly 10 includes a base 11 and a pivot mount 12 integrally connected with a rear side of the base 11. Typically, the base assembly 10 further includes a worktable 13 and a set of fences 14. The worktable 13 is rotatably mounted on the top surface of the base 11 to support a workpiece, and the set of fences 14 is positioned on the top surface of the base 11 for abutting against the workpiece.

The sawing assembly 20 includes a support post 21, a rocker arm 22, a saw blade 23, and a driving device 24. The support post 21 is rotatably mounted on the pivot mount 12, such that the support post 21 is rotatable about a virtual rotation axis VA. In this embodiment, the top side of the support post 21 is further equipped with a slide rail device 25. The rocker arm 22 is pivotally connected with the support post 21 (in this embodiment, the rocker arm 22 is pivotally connected to the support post 21 via the slide rail device 25) and can pivotally swing towards the base assembly 10. The saw blade 23 is rotatably mounted on the rocker arm 22. The driving device 24 is mounted on the rocker arm 22 and drives the saw blade 23 to rotate. In this embodiment, the driving device 24 is essentially realized as a motor mounted on the rocker arm 22 and can, for example, drive the saw blade 23 to rotate via a belt (not shown). Typically, the sawing assembly 20 is further equipped with a saw blade guard 26 and a handle 27.

Figure 4:
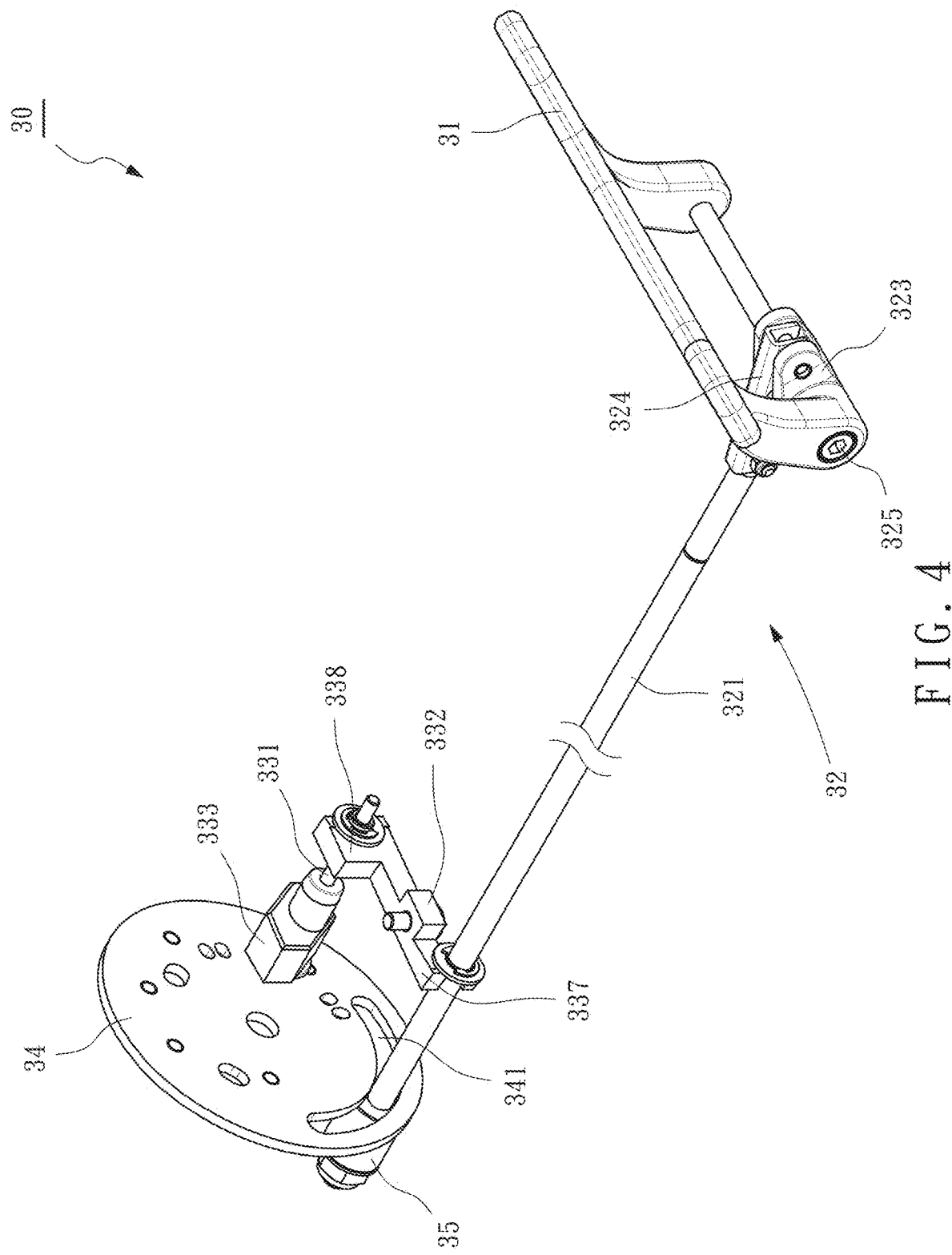
FIG. 4 is a perspective view of a bevel angle control mechanism of the sawing machine according to the embodiment of the present invention.
Figure 5:
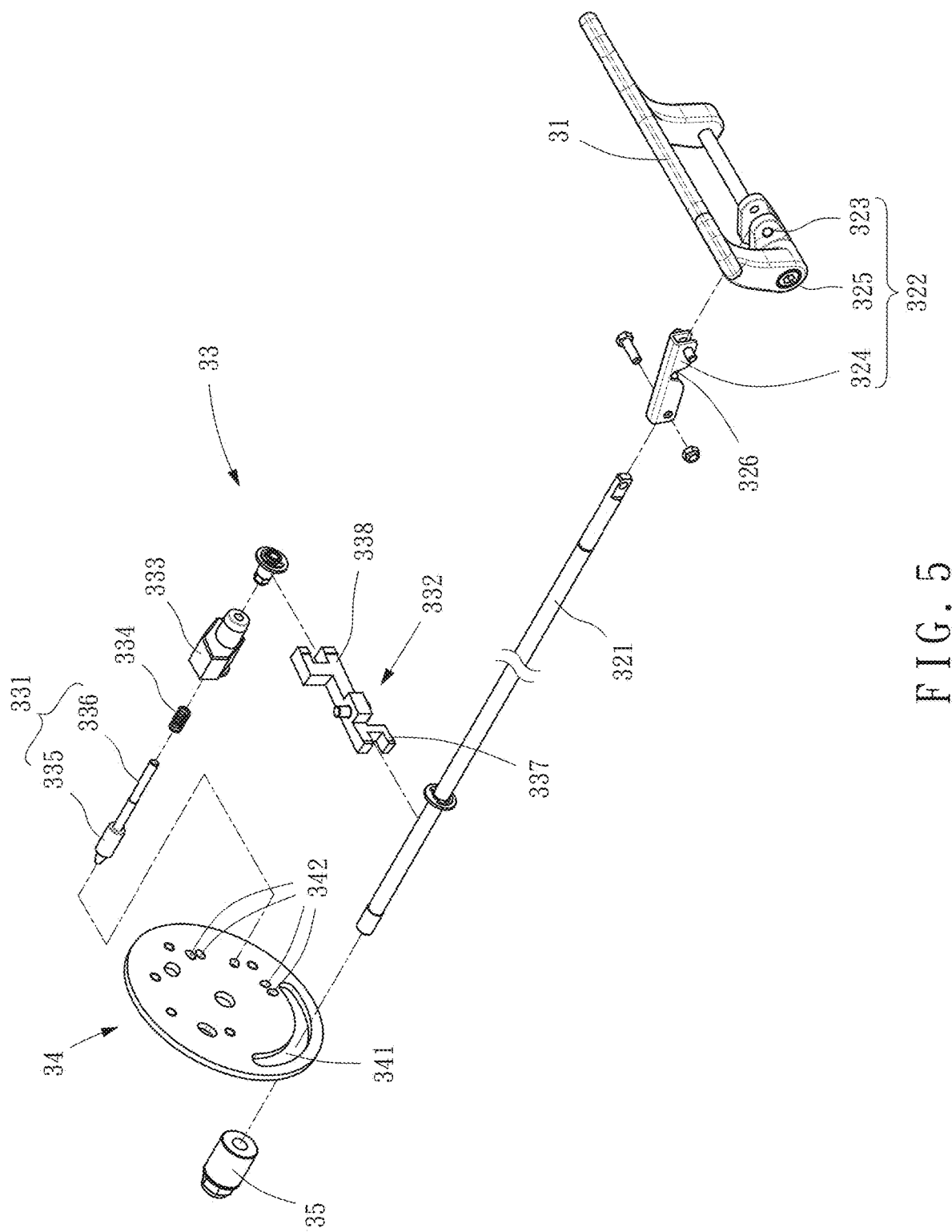
FIG. 5 is a partial exploded view of the bevel angle control mechanism shown in FIG. 4.

Referring to FIGS. 3 to 5. The bevel angle control mechanism 30 includes the aforementioned control handle 31, a pull rod unit 32, a positioning pin unit 33, a positioning turntable 34, and a retaining block 35.

Figure 6:
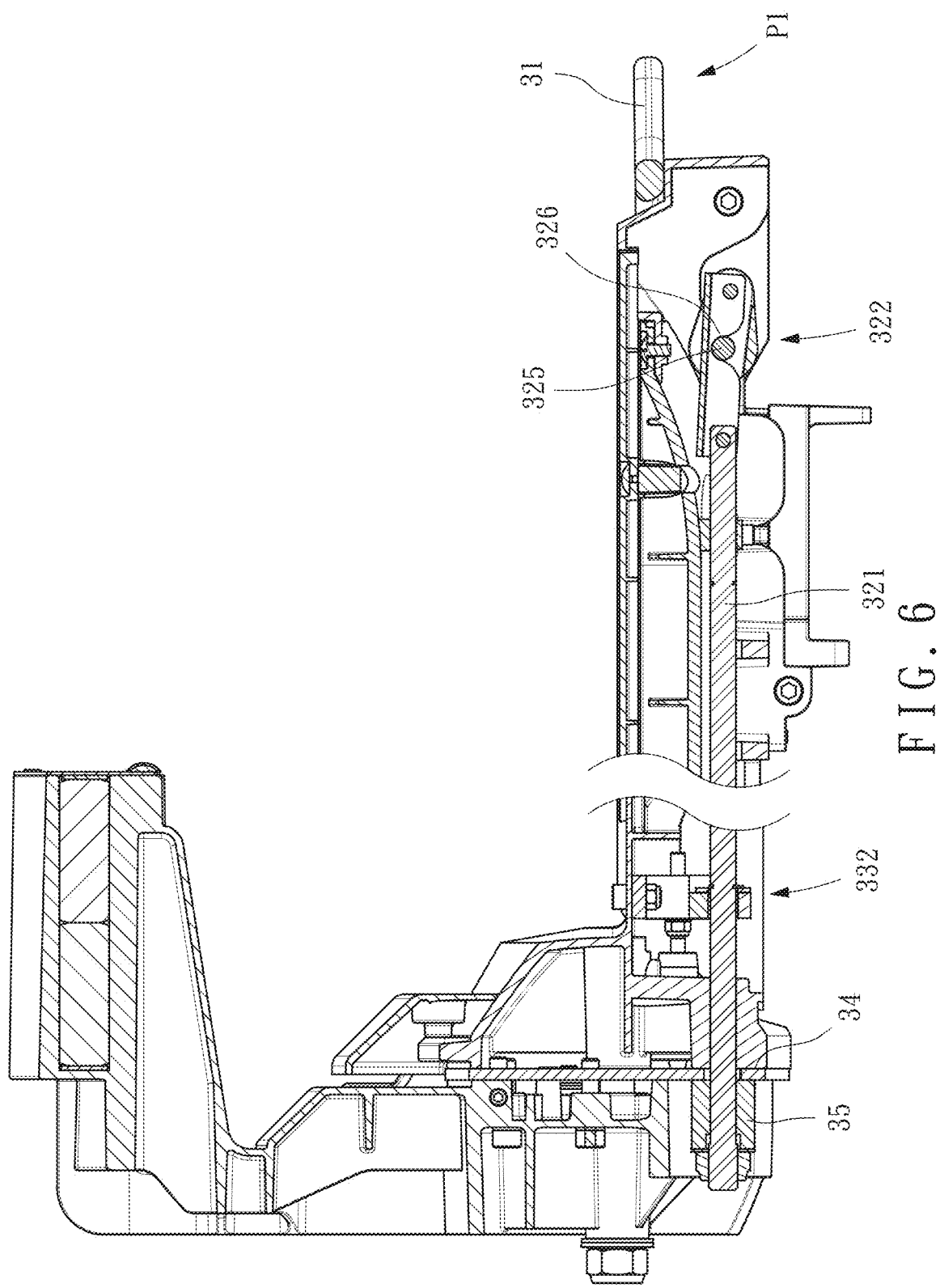
FIG. 6 is a partial sectional view taken along line A-A of FIG. 2, showing the state where the control handle is in the locked position and the sawing assembly is at an angle of 0 degrees.
Figure 9:
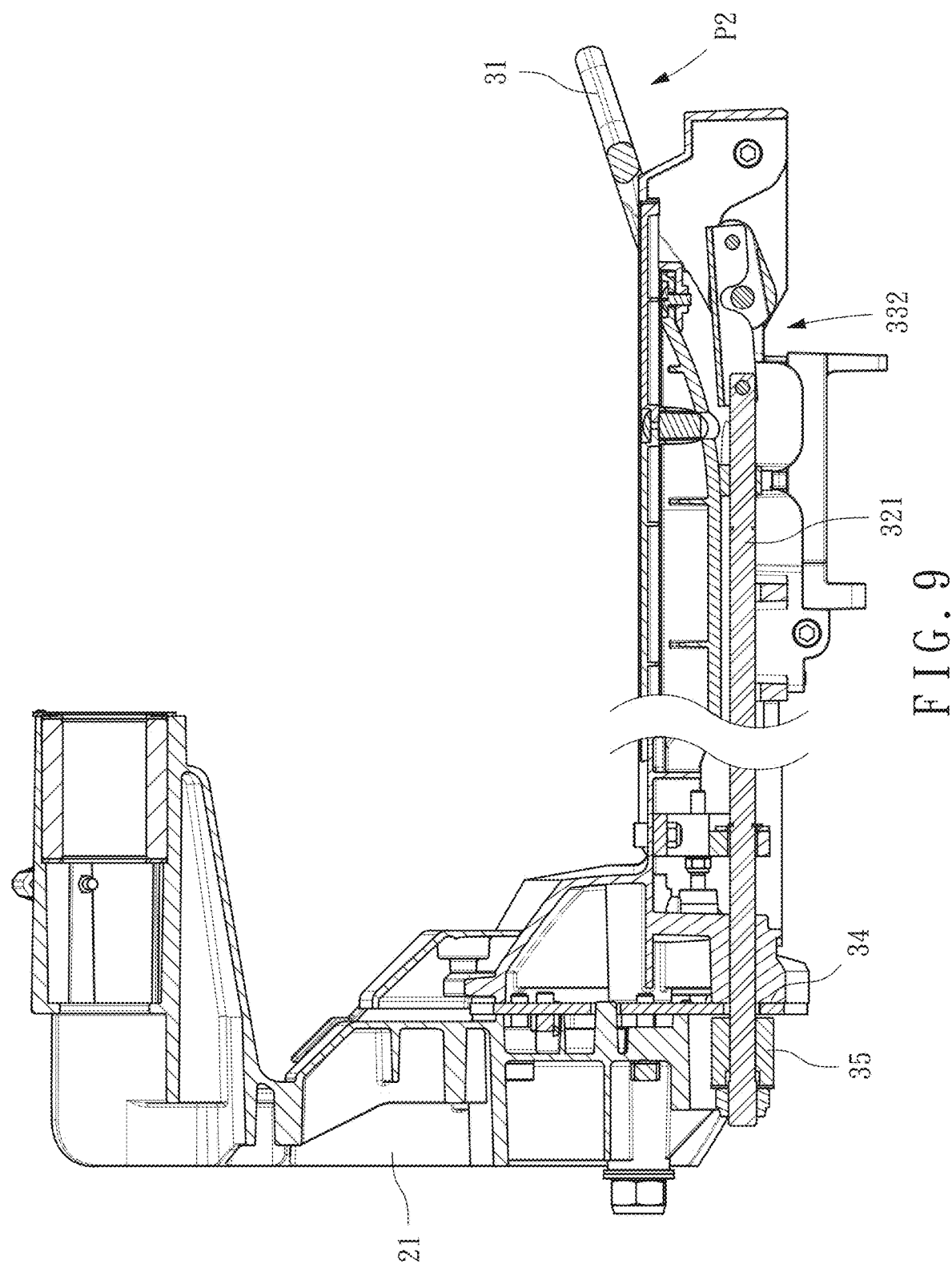
FIG. 9 is similar to FIG. 6, but showing the state where the control handle is in the unlocked position and the sawing assembly is at an angle of 25 degrees.
Figure 12:
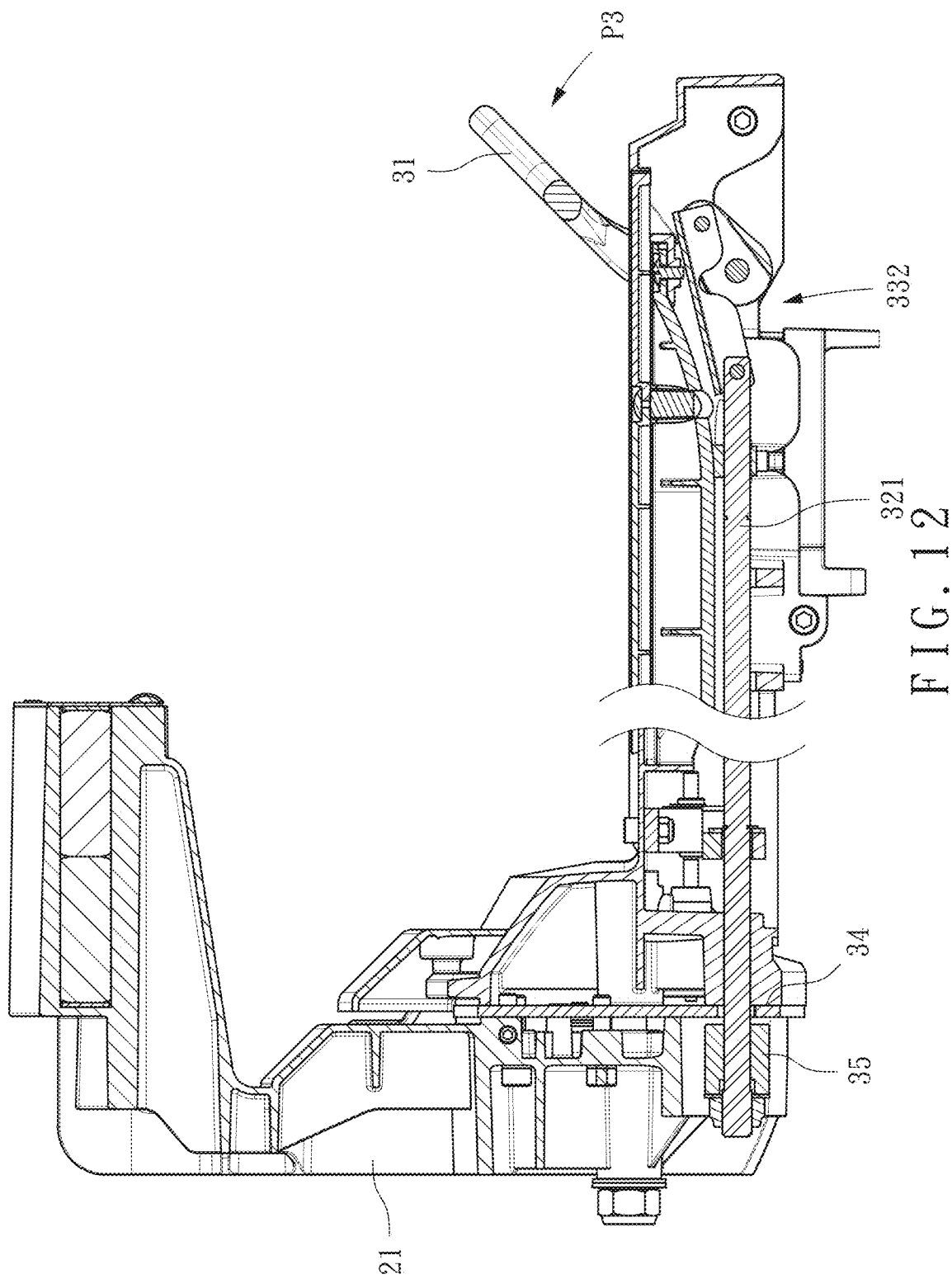
FIG. 12 is similar to FIG. 6, but showing the state where the control handle is in the disengaged position and the sawing assembly is at an angle of 33.86 degrees.

The control handle 31 is pivotally connected to the front side of the base 11 via a connecting shaft 325, such that the control handle 31 can be rotated among a locked position P1 (as shown in FIG. 6), an unlocked position P2 (as shown in FIG. 9), and a disengaged position P3 (as shown in FIG. 12) by the operation of the operator.

The pull rod unit 32 is mounted on the base 11 and includes a pull rod 321 and a set of connecting rods 322. The control handle 31 is connected with the pull rod 321 by the set of connecting rods 322, so that the pull rod 321 can move back and forth along its axial direction along with the rotational movement of the control handle 31 at different angles. Specifically, in this embodiment, the set of connecting rods 322 includes a first rod 323, a second rod 324, and the aforementioned connecting shaft 325. The first rod 323 is integrally connected with the control handle 31 and extends forward. An end of the first rod 323 and an end of the control handle 31 are both connected to the connecting shaft 325. The opposite end of the first rod 323 is pivotally connected to an end of the second rod 324. The second rod 324 has a notch 326. The other end of the second rod 324, i.e., the end remote from the first rod 323 and the control handle 31, is pivotally connected to the pull rod 321.

Figure 7:
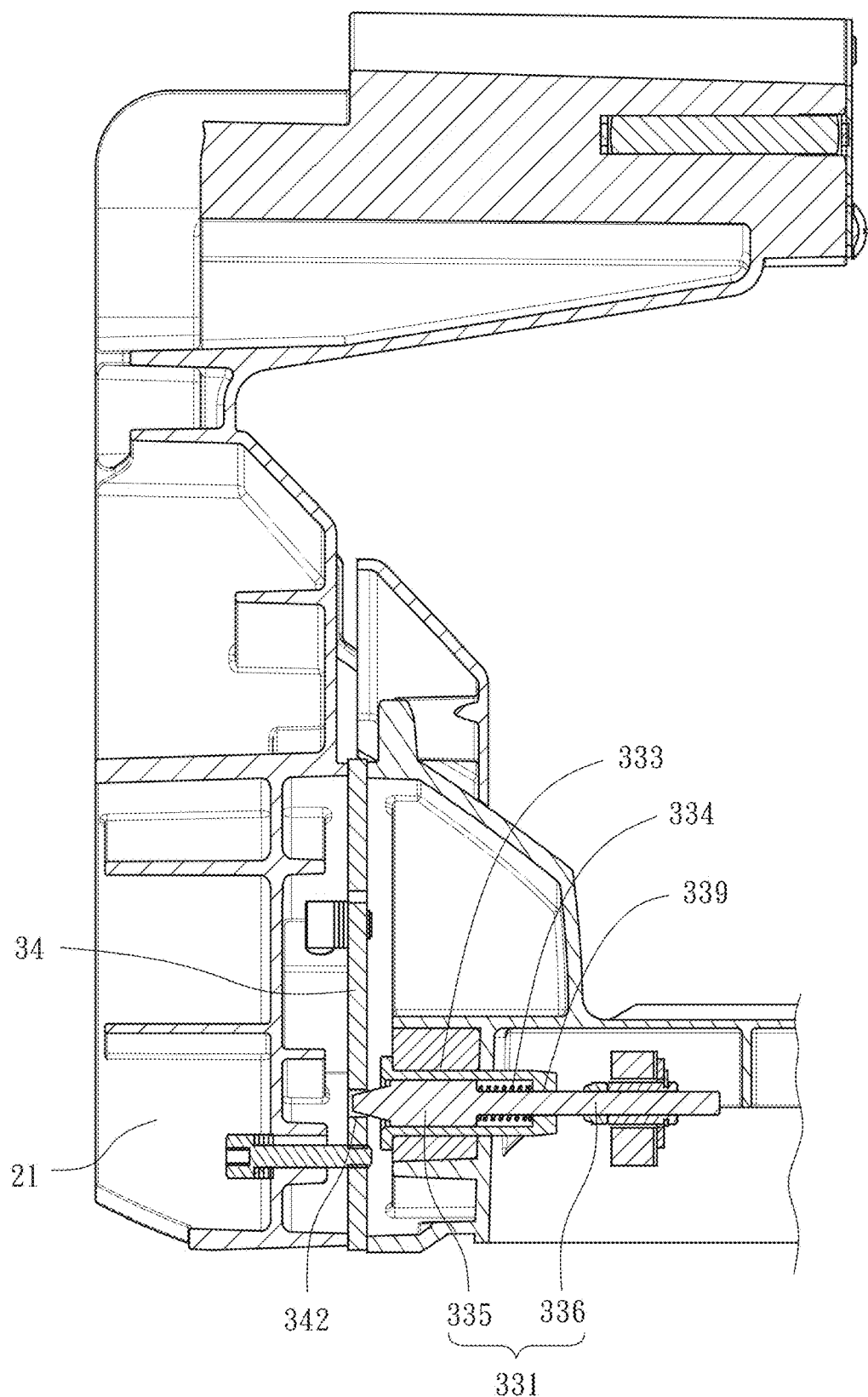
FIG. 7 is a partial sectional view taken along line B-B of FIG. 2, showing the state where the control handle is in the locked position and the sawing assembly is at the angle of 0 degrees.

The positioning pin unit 33 is mounted to the base 11 and connected with the pull rod 321. In this embodiment, the positioning pin unit 33 includes a positioning pin 331, a rotating bracket 332, a spring housing barrel 333, and a compression spring 334. The rotating bracket 332 is in-site rotatably mounted on the base 11 and includes a first arm 337 and a second arm 338, which are parallel to each other. The first arm 337 is sleevingly coupled with the pull rod 321, and the second arm 338 is sleevingly coupled with the positioning pin 331, such that the positioning pin 331 can be driven to move in a direction parallel to the axial direction of the pull rod 321 and opposite to the moving direction of the pull rod 321 as the pull rod 321 moves. Therefore, when the pull rod 321 is pulled forward, the first arm 337 rotates towards the front side of the base 11 and the second arm 338 rotates towards the direction of the support post 21, thereby driving the positioning pin 331 to move backward. Conversely, when the pull rod 321 is pulled backward, the first arm 337 rotates towards the direction of the support post 21 and the second arm 338 rotates towards the direction of the control handle 31, thereby driving the positioning pin 331 to move forward. Referring to FIGS. 5 and 7, the spring housing barrel 333 is mounted to the base assembly 10, and the bottom of the spring housing barrel 333 has a through hole 339. The positioning pin 331 is movably disposed in the spring housing barrel 333, and the positioning pin 331 includes a head portion 335 and a body portion 336 connected with the head portion 335. At least a portion of the head portion 335 is extended outside the spring housing barrel 333, and the head portion 335 has a conical surface. The body portion 336 of the positioning pin 331 passes through the through hole 339 and the end of the body portion 336 is connected with the second arm 338 of the rotating bracket 332. The compression spring 334 is received in spring housing barrel 333 in a way that the compression spring 334 is abutted between the bottom of the spring housing barrel 333 and the head portion 335 to exert a force on the head portion 335 to push the head portion towards an outside of the spring housing barrel 333.

Referring to FIGS. 4 and 5, the positioning turntable 34 is fixedly provided on the support post 21, such that the positioning turntable 34 can rotate with the rotation of the support post 21. The positioning turntable 34 includes an arc groove 341 and multiple positioning holes 342. The pull rod 321 passes through the arc groove 341, and the positions of these positioning holes 342 correspond to specific angles, namely 0 degrees, ±33.86 degrees, and ±45 degrees, respectively. Taking FIG. 4 as an example, when the support post 21 is set in a state perpendicular to the base 11, the positioning pin 331 is positioned in the positioning hole 342 corresponding to 0 degrees.

The retaining block 35 is provided at the end of the pull rod 321 where is remote from the control handle 31. The retaining block 35 can be made of a material with a high friction coefficient. When the pull rod 321 is pulled forward, the pull rod 321 can drive the retaining block 35 to firmly press against the rear side of the positioning turntable 34. By using the friction force between the retaining block 35 and the positioning turntable 34, the positioning turntable 34 and the support post 21 connected to the positioning turntable 34 are prevented from rotation.

The sawing machine 1 of this embodiment achieves three-stage adjustment functions by rotating the control handle 31 to different angles, which correspond to the locked position P1, the unlocked position P2, and the disengaged position P3, respectively, as detailed illustration below.

When the control handle 31 is rotated to the locked position P1, the mechanism of adjustment is recited as follows.

Figure 8:
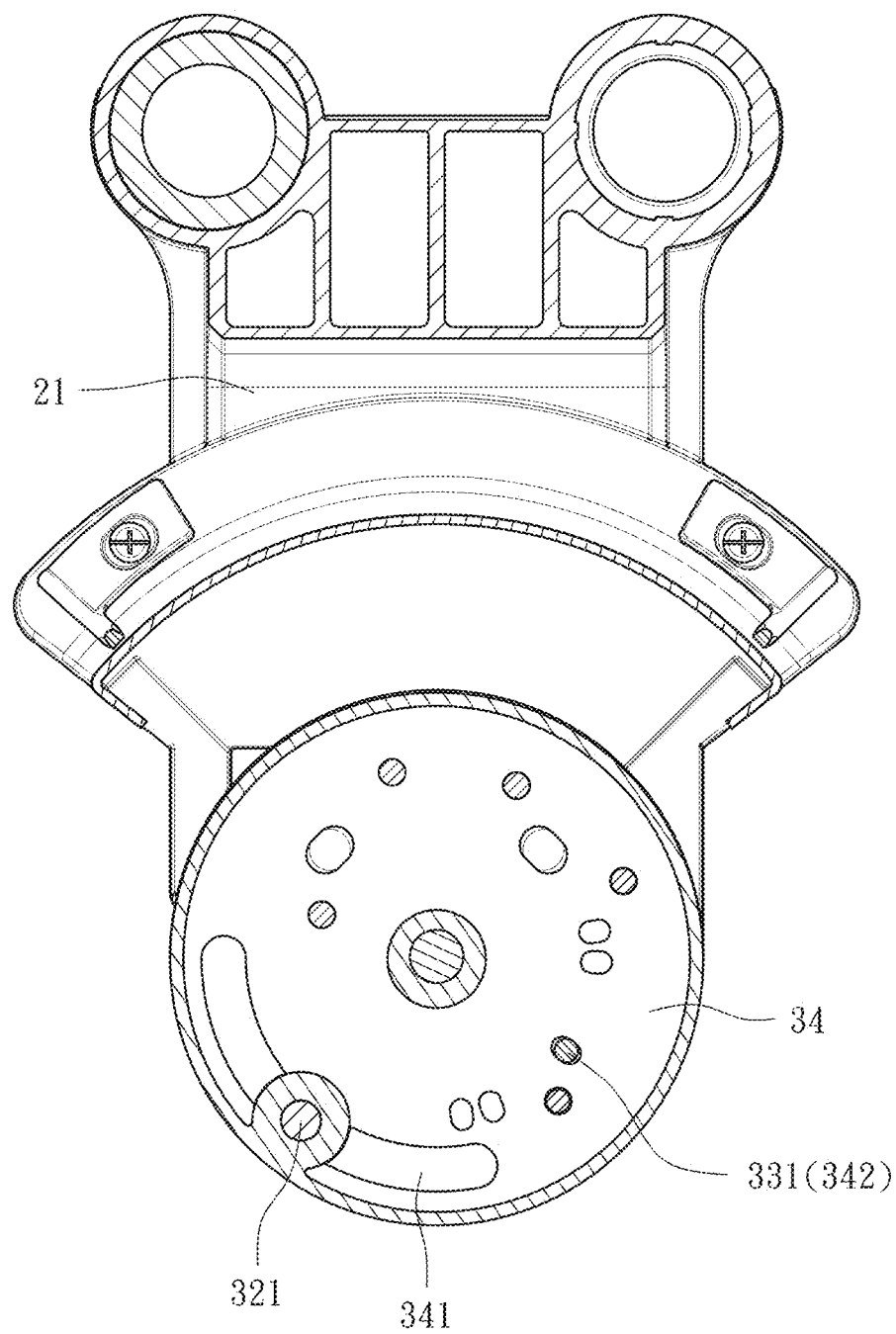
FIG. 8 is a sectional view taken along line C-C of FIG. 2, showing the state where the control handle is in the locked position and the sawing assembly is at the angle of 0 degrees.

Referring to FIGS. 6 to 8, FIGS. 7 and 8 show the state that the positioning pin 331 is positioned in the positioning hole 342 corresponding to 0 degrees. When the control handle 31 is rotated to the locked position P1, the control handle 31 is stayed at a horizontal posture. The control handle 31 drives the pull rod 321 to move forward through the set of connecting rods 322, causing the connecting shaft 325 connected with the pull rod 321 to be precisely positioned in the notch 326 of the second rod 324, thereby providing a clear sense of firm locking feeling. As the pull rod 321 moves forward, it drives the retaining block 35 to move forward to press against the positioning turntable 34, and the rotating bracket 332 drives the positioning pin 331 to move towards the positioning turntable 34. In FIG. 7, the support post 21 is stayed at a position where the positioning pin 331 is aimed at the positioning hole 342 corresponding to 0 degrees, so under the force of the compressed spring 334, the positioning pin 331 moves towards the positioning hole 342 corresponding to 0 degrees, such that the end of the head portion 335 of the positioning pin 331 will be inserted into the positioning hole 342 at 0 degrees. It should be noted that if the support post 21 is stayed at an angle that the aforesaid positioning hole 342 corresponding to a specific angle is not aimed at the positioning pin 331 at this time, the end of the head portion 335 of the positioning pin 331 will be stopped at the front side of the positioning turntable 34. However, because the retaining block 35 has already firmly pressed against the positioning turntable 34, the support post 21 still cannot be rotated.

When the control handle 31 is rotated to the unlocked position P2, the mechanism of adjustment is recited hereunder.

Figure 10:
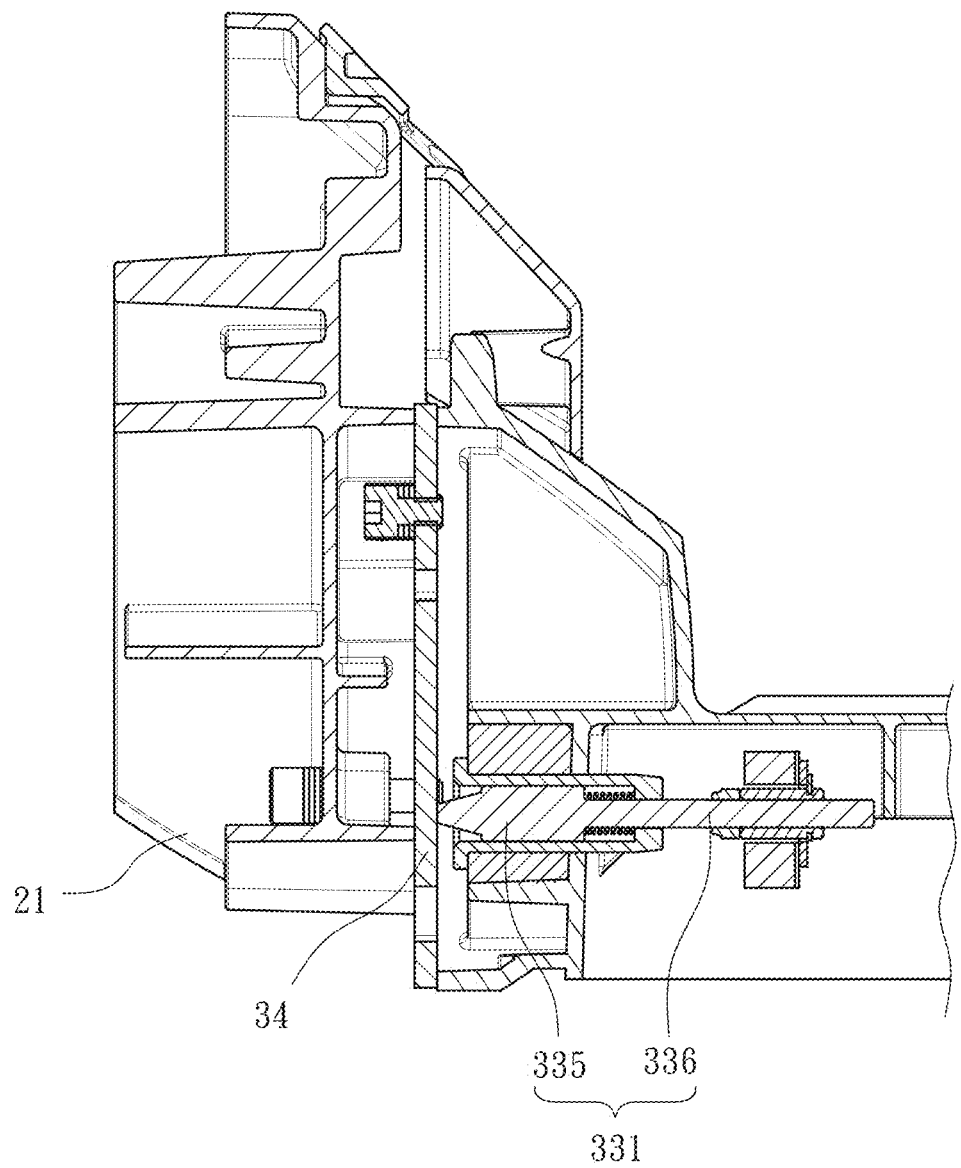
FIG. 10 is similar to FIG. 7, but showing the state where the control handle is in the unlocked position and the sawing assembly is at the angle of 25 degrees.
Figure 11:
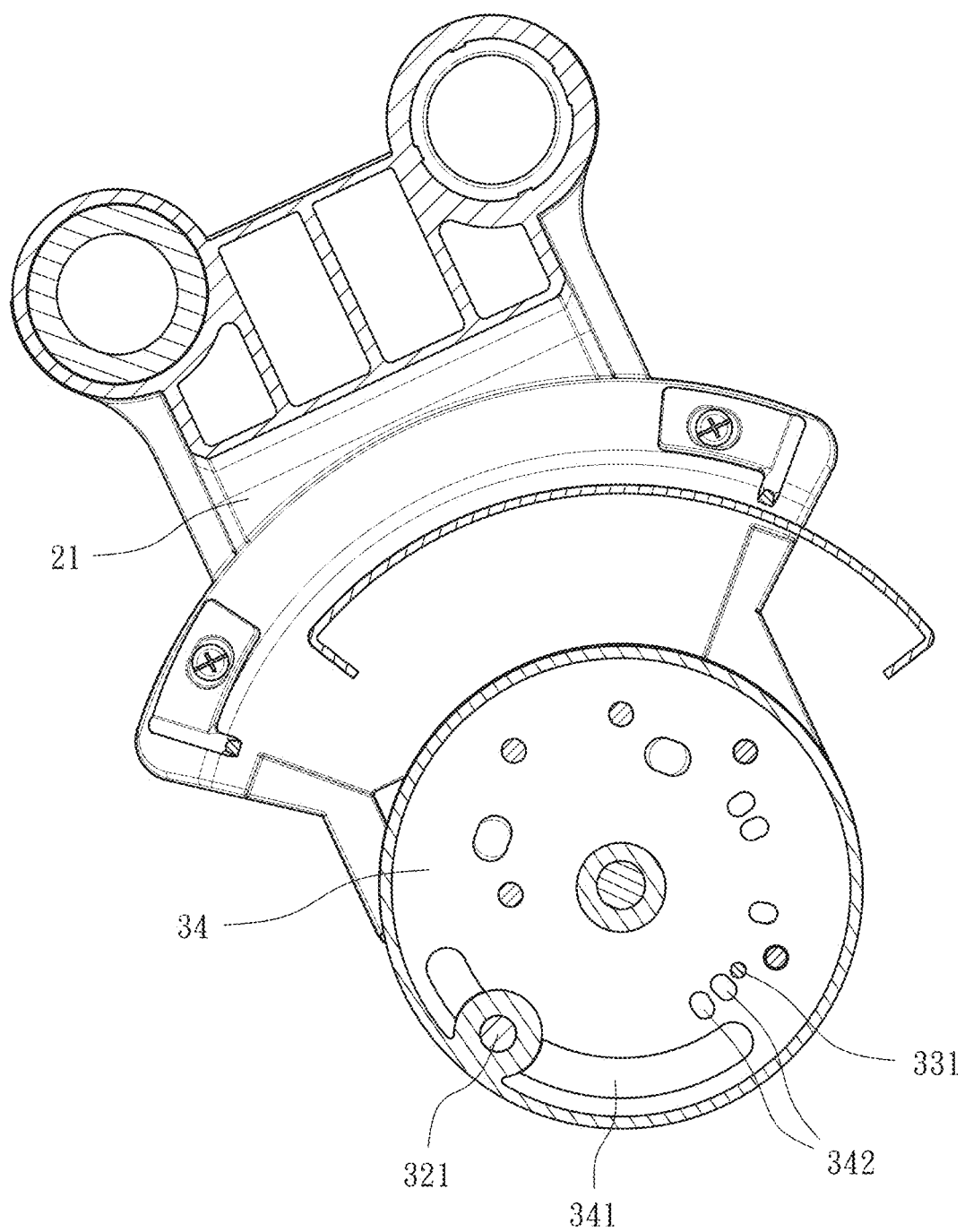
FIG. 11 is similar to FIG. 8, but showing the state where the control handle is in the unlocked position and the sawing assembly is at the angle of 25 degrees.

Referring to FIGS. 9 to 11, FIGS. 10 and 11 show that the support post 21 is rotated about 25 degrees compared to the support post 21 shown in FIG. 6. When the control handle 31 is rotated to the unlocked position P2, with the orientation of FIG. 9 as a reference, the control handle 31 is rotated upward in a counterclockwise direction. The control handle 31 drives the pull rod 321 to move towards the support post 21 (positioning pin 331 moves forward) through the set of connecting rods 322, creating a gap between the retaining block 35 and the positioning turntable 34. Therefore, the retaining block 35 does not tighten the positioning turntable 34, i.e., being disengaged from the positioning turntable 34. In FIG. 10, since the support post 21 is stayed at a non-specific angle corresponding to 25 degrees, the end of the head portion 335 of the positioning pin 331 is stopped at the front side of the positioning turntable 34. However, because the retaining block 35 does not tighten the positioning turntable 34, the support post 21 can be rotated freely at this time.

When the control handle 31 is rotated to the disengaged position P3, the mechanism of adjustment is described hereinafter.

Figure 13:
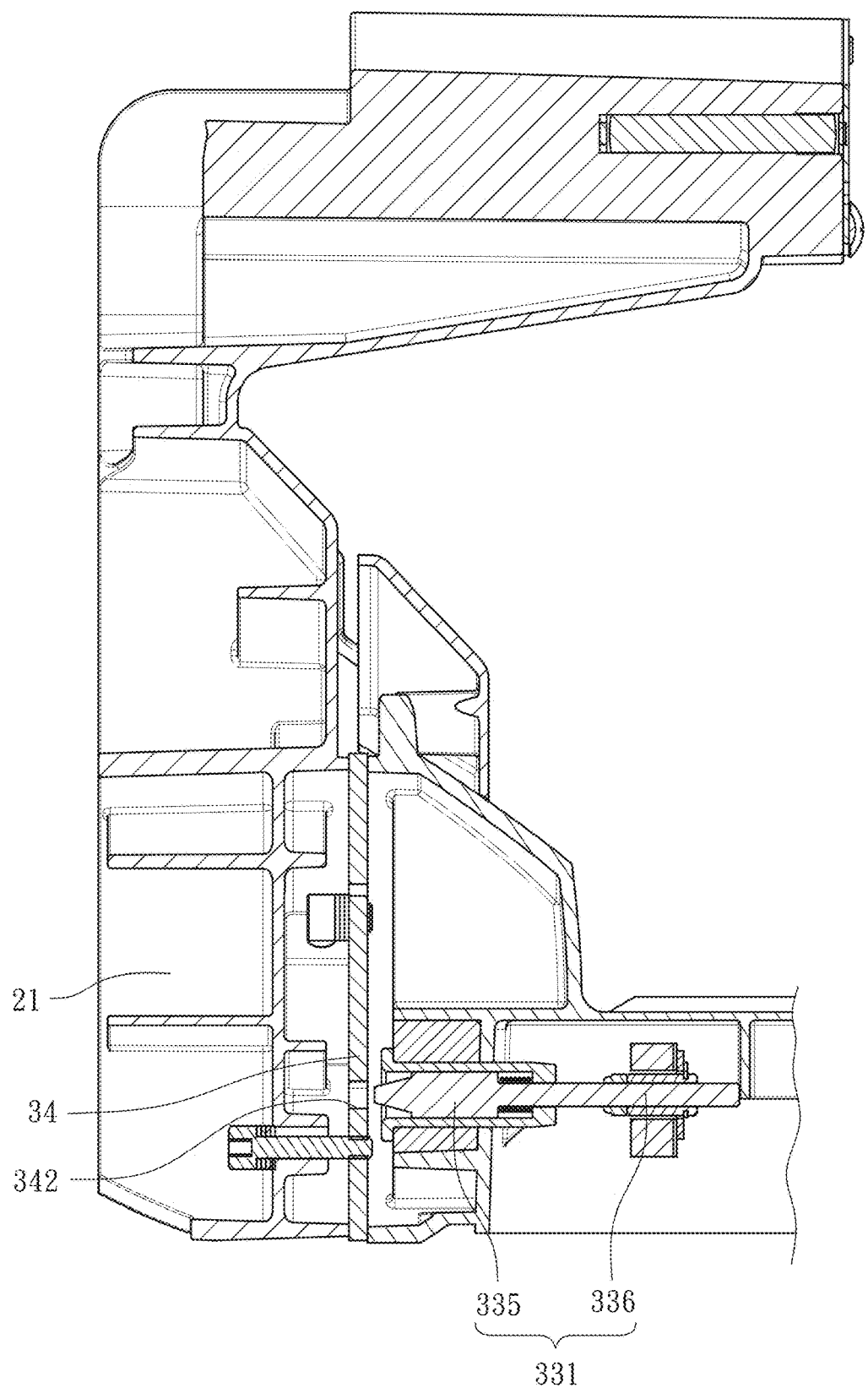
FIG. 13 is similar to FIG. 7, but showing the state where the control handle is in the disengaged position and the sawing assembly is at the angle of 33.86 degrees.
Figure 14:
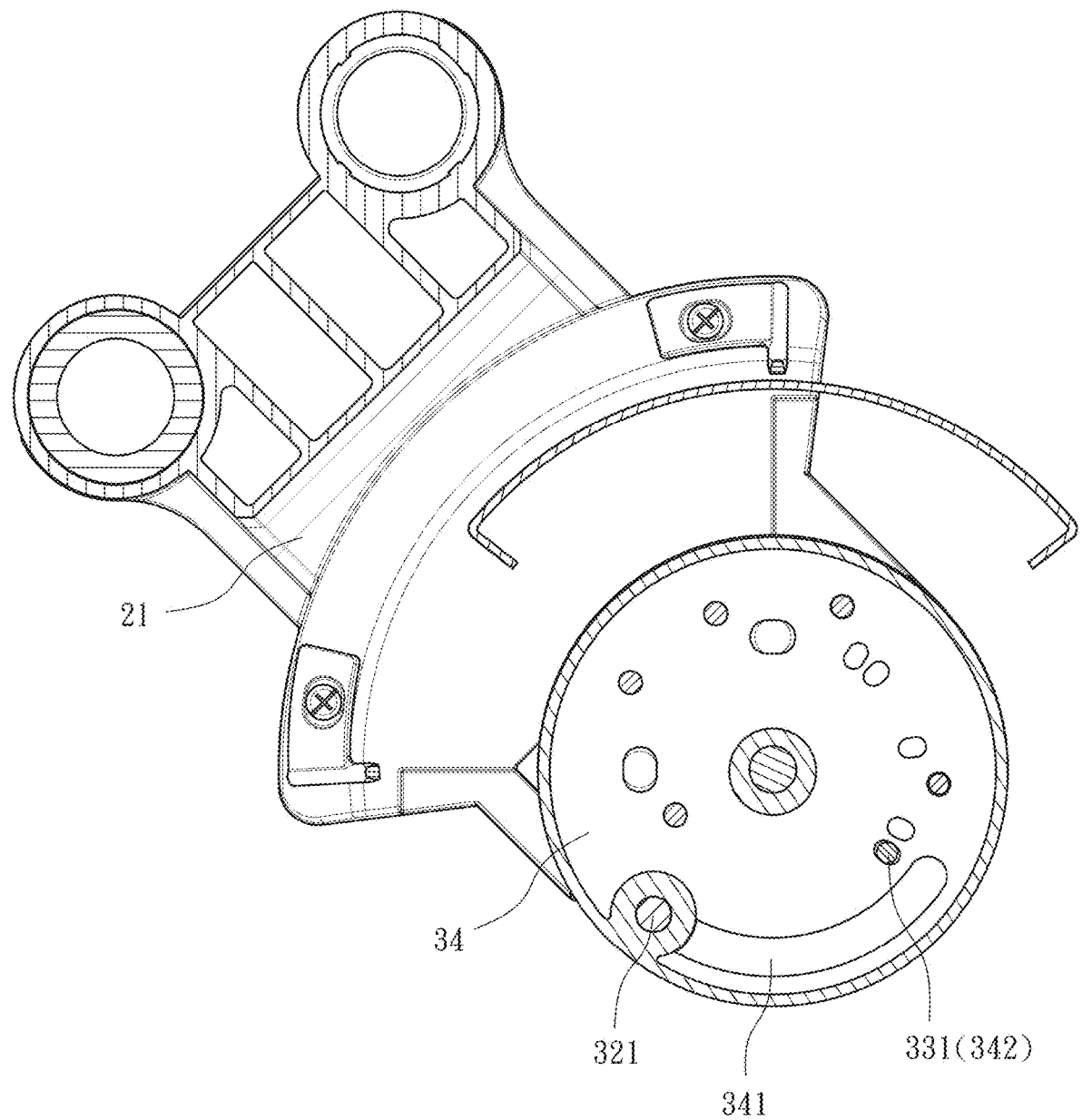
FIG. 14 is similar to FIG. 8, but showing the state where the control handle is in the disengaged position and the sawing assembly is at the angle of 33.86 degrees.

Referring to FIGS. 12 to 14, FIGS. 13 and 14 depict the state that the positioning pin 331 is aimed at the positioning hole 342 corresponding to 33.86 degrees. When the support post 21 is rotated to a specific angle, and the positioning pin 331 is aimed at the positioning hole 342 of a specific angle, if the operator wants to change the rotation angle of the support post 21 again, the operator must rotate the control handle 31 to the disengaged position P3. With the orientation of FIG. 12 as a reference, the control handle 31 is now rotated slightly upward in a counterclockwise direction compared to FIG. 9. As such, the control handle 31 will drive the pull rod 321 to further move towards the support post 21 through the set of connecting rods 322, such that the positioning pin 331 will move further forward, allowing the end of the positioning pin 331 to disengage from the positioning hole 342. At this point, the retaining block 35 is still disengaged from the positioning turntable 34, allowing the operator to rotate the support post 21 and the sawing assembly 20 to a desired angle.

It should be noted that the position of the pull rod 321 when the control handle 31 is in the disengaged position P3 is closer to the support post 21 than the position of the pull rod 321 when the control handle 31 is in the unlocked position P2 is. That is, when the control handle 31 stays at the disengaged position P3, the pull rod 321 will be located at a first position as shown in FIG. 12, and when the control handle 31 stays at the unlocked position P2, the pull rod 321 will be located at a second position as shown in FIG. 9, and the first position is closer to the support post 21 than the second position is.

With the structural design of the sawing machine 1 in this embodiment, since the control handle 31 is located on the front side of the base 11, it is convenient for the operator to rotate the control handle 31, allowing the support post 21 and the components, such as the rocker arm 22, connected with the support post 21 to be rotatable to different angles. Furthermore, the control handle 31 is used to lock the positioning turntable 34 together with the support post 21 connected to the positioning turntable 34, allowing the operator to saw the workpiece at different angles. In another aspect, in this embodiment, the functions of locking, unlocking, and disengaging the positioning angle are integrated into the same control handle 31, allowing the operator to simply complete the above three adjustment functions by using the control handle 31. Therefore, the sawing machine 1 of this embodiment significantly improves operational convenience and saves operation time.

At last, it should be mentioned again that the constituent elements disclosed in the above embodiments of the present invention are only taken as examples for illustration, not intended to limit the scope of the present invention. The substitution or variation of other equivalent elements should be included within the scope of the following claims of the present invention.

What is claimed is:

1. A sawing machine, comprising:
    a base assembly including a base and a pivot mount connected with a rear side of the base;
    a sawing assembly including a support post rotatably connected with the pivot mount and rotatable about a rotation axis, a rocker arm pivotally connected with the support post and swingable towards the base assembly, a saw blade rotatably mounted to the rocker arm, and a driving device disposed with the rocker arm to drive the saw blade to rotate; and
    a bevel angle control mechanism, comprising:
        a control handle pivotally disposed with a front side of the base and rotatable among a locked position, an unlocked position, and a disengaged position;
        a pull rod unit disposed with the base and provided with a pull rod connected with the control handle in a way that the pull rod is driven by the control handle to move along an axial direction of the pull rod;
        a positioning pin unit disposed with the base, connected with the pull rod, and provided with a positioning pin in a way that the positioning pin moves along with the pull rod in a direction parallel to the axial direction of the pull rod and opposite to a moving direction of the pull rod;
        a positioning turntable mounted to the support post and rotatable with the support post, the positioning turntable including an arc groove and at least one positioning hole, wherein the pull rod passes through the arc groove; and a retaining block mounted on an end of the pull rod remote from the control handle;

wherein when the control handle is in the locked position, the retaining block firmly presses against the positioning turntable, and an end of the positioning pin is stopped against a front side of the positioning turntable or inserted into the at least one positioning hole;

wherein when the control handle is in the unlocked position, the retaining block is disengaged from the positioning turntable, and the end of the positioning pin is stopped against the front side of the positioning turntable or inserted into the at least one positioning hole; and wherein when the control handle is in the disengaged position, the retaining block is disengaged from the positioning turntable, and the end of the positioning pin is disengaged from the at least one positioning hole.

2. The sawing machine as claimed in claim 1, wherein the positioning pin unit further comprises a rotating bracket rotatably mounted on the base; the rotating bracket comprises a first arm connected with the pull rod, and a second arm parallel to the first arm and connected with the positioning pin.

3. The sawing machine as claimed in claim 2, wherein the positioning pin unit further comprises a spring housing barrel disposed with the base and provided with a bottom having a through hole, and a compression spring; the positioning pin is movably mounted in the spring housing barrel and passes through the through hole; the positioning pin has a head portion, and at least a portion of the head portion protrudes outside the spring housing barrel; the compression spring is abutted between the bottom of the spring housing barrel and the head portion.

4. The sawing machine as claimed in claim 3, wherein the head portion has a conical surface.

5. The sawing machine as claimed in claim 1, wherein the pull rod unit further comprises a set of connecting rods; the control handle is connected with the pull rod via the set of connecting rods.

6. The sawing machine as claimed in claim 5, wherein the set of connecting rods comprises a first rod and a second rod; the first rod has an end connected with the control handle, and an opposite end pivotally connected with the second rod; the second rod has an end, which is remote from the first rod and pivotally connected with the pull rod.

7. The sawing machine as claimed in claim 6, wherein the set of connecting rods comprises a connecting shaft; the control handle is connected with the first rod via the connecting shaft; the second rod has a notch; when the control handle is in the locked position, the connecting shaft is engaged in the notch.

8. The sawing machine as claimed in claim 1, wherein when the control handle is in the disengaged position, the pull rod is located at a first position, and when the control handle is in the unlocked position, the pull rod is located at a second position; the first position is closer to the support post than the second position is.

\* \* \* \* \*